(12) United States Patent
Kreibig et al.

(10) Patent No.: US 8,449,765 B2
(45) Date of Patent: May 28, 2013

(54) FILTER WITH DATA STORAGE PROVIDED WITH AN ANTENNA FOR TRANSMITTING SIGNALS

(75) Inventors: Micha Kreibig, Rehlingen-Slersburg (DE); Norbert Sann, Riegelsberg (DE)

(73) Assignee: Hydac Filtertechnik GmbH, Sulzback/Saar (DE)

( * ) Notice: Subject to any disclaimer, the term of this patent is extended or adjusted under 35 U.S.C. 154(b) by 178 days.

(21) Appl. No.: 12/735,446

(22) PCT Filed: Jan. 30, 2009

(86) PCT No.: PCT/EP2009/000603
§ 371 (c)(1),
(2), (4) Date: Jul. 16, 2010

(87) PCT Pub. No.: WO2009/098002
PCT Pub. Date: Aug. 13, 2009

(65) Prior Publication Data
US 2011/0024337 A1    Feb. 3, 2011

(30) Foreign Application Priority Data
Feb. 7, 2008    (DE) .................. 10 2008 009 242

(51) Int. Cl.
*B01D 35/143*    (2006.01)
(52) U.S. Cl.
USPC ........................................................ 210/85
(58) Field of Classification Search
CPC .................................................. B01D 2201/52
USPC ....................................................... 210/85, 100
See application file for complete search history.

(56) References Cited

U.S. PATENT DOCUMENTS

| 7,898,495 | B2 * | 3/2011 | Burke et al. | 343/872 |
| 8,303,698 | B2 * | 11/2012 | Grzonka et al. | 96/417 |
| 2009/0246090 | A1 * | 10/2009 | Burke et al. | 422/119 |

FOREIGN PATENT DOCUMENTS

| DE | 101 51 270 A1 | 5/2003 |
| DE | 102004054172 A1 * | 5/2006 |
| WO | WO 2004/085027 A1 | 10/2004 |
| WO | WO 2005/113112 A1 | 12/2005 |
| WO | WO 2006/050934 A1 | 5/2006 |
| WO | WO 2006/136409 A1 | 12/2006 |

* cited by examiner

*Primary Examiner* — Terry Cecil
(74) *Attorney, Agent, or Firm* — Roylance, Abrams, Berdo and Goodman LLP

(57) ABSTRACT

A filter element (1) for filtering fluids, such as hydraulic fluids or gases, is in a filter housing (12) having an inlet (18) for the fluid to be filtered, an outlet (20) for the filtered fluid. The filter element has a data storage (52). Data stored in the data storage (52) is electronically readable from the data storage (52) by a read and/or write device (70). An antenna (60) extends outside the data storage (52) and provides the signal coupling between the data storage (52) and the read and/or write device (70). The antenna (60) extends at least in sections about a longitudinal axis (44) of the filter element (1) such that independently from the angular position of the filter element (1) and the attached data storage (52) a signal coupling between the data storage (52) and the read and/or write device (70) is ensured.

11 Claims, 3 Drawing Sheets

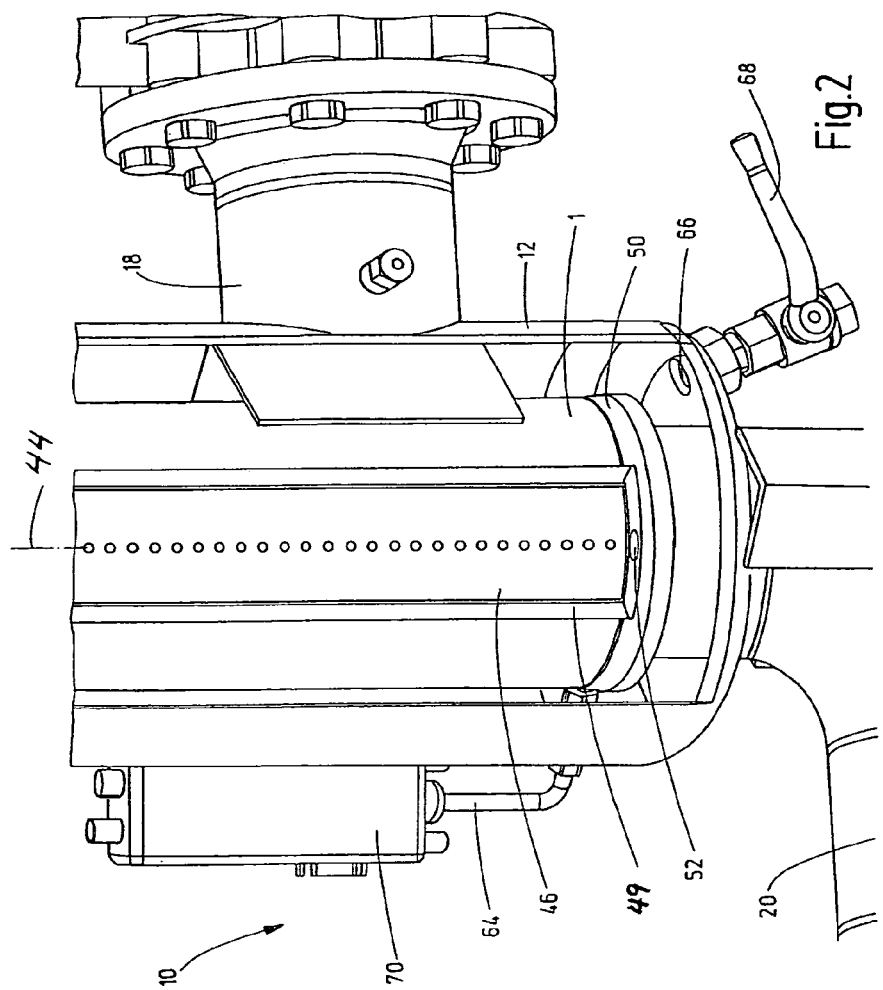

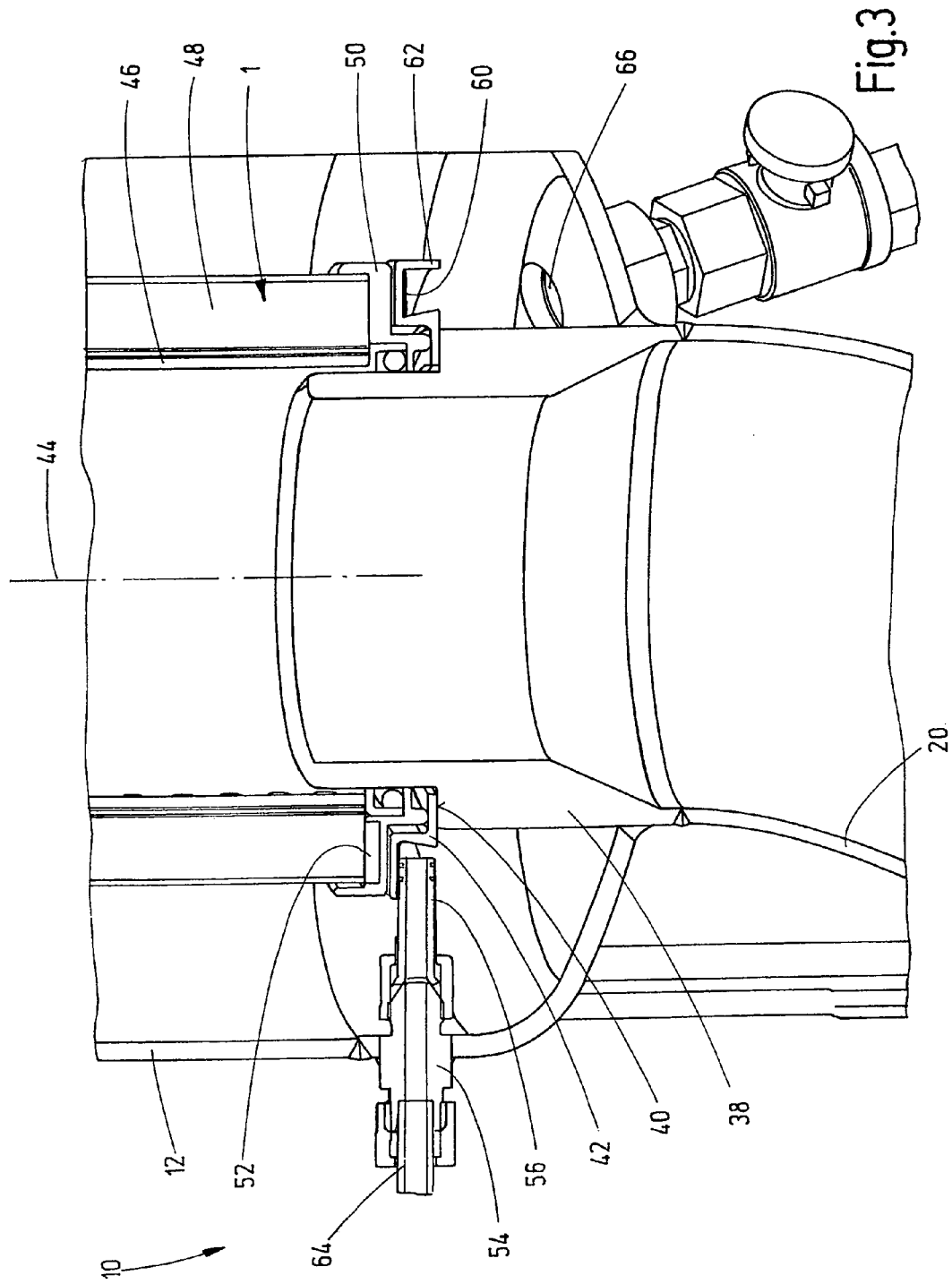

FILTER WITH DATA STORAGE PROVIDED WITH AN ANTENNA FOR TRANSMITTING SIGNALS

FIELD OF THE INVENTION

The invention relates to a filter element for filtering fluids, such as hydraulic fluids or gases, and to a filter device comprising such a filter element.

BACKGROUND OF THE INVENTION

Filter elements matched with a respective application are used for filtering liquid, gaseous, or pasty media, for example, hydraulic media, process liquids, or even food, like beverages. These filter elements are different with respect to a plurality of parameters, such as the material that is used for the filter material, its pore size, or pressure stability. In many cases these different features cannot be discerned or are not readily detectable by visual inspection.

A fundamental risk exists that a filter element inappropriate or not optimally suited for the respective application will be installed into an existing filter device. As a result of this occurrence the filter device, the medium to be filtered, or the system downstream of the filter device may be damaged. For example, inadequate filtration may result in the abrasive wear or failure of a component in the filter device. Similar problems may also arise when using filter elements that exhibit an inadequate chemical and/or mechanical stability with respect to the media to be filtered. Furthermore, the pollutants released by the inappropriate filter element may contaminate the fluid. In addition, when replacing a used filter element one may forget to insert a new filter element into the related filter housing, the empty filter housing being inadvertently connected to the filter device.

Another problem arises from not being able to determine in a simple way with respect to a filter element that is in use, how long the filter element can still guarantee adequate filtration under the given operating conditions. This problem applies all the more to certain types of filter elements that do not exhibit a continuous reduction in the filtering property; rather their filtering property decreases abruptly after a working period depending on the type of operation.

WO 2004/085027 A1 discloses a system comprising a filter and a related filter element. The filter element is provided with a data memory unit for storing data relating to the filter element.

DE 10 2004 054 172 A1 and WO 2006/050934 A1 disclose a filter element provided with a data memory unit for storing data in its data memory. The data can be read electronically out of the data memory by a read and/or write device disposed outside the filter element. The data items are transmitted by an antenna mounted on the data memory unit and is formed by the data memory unit and transmitting to the data memory unit the energy required to operate the data memory unit. This data memory unit does not have to have its own dedicated source of energy. The distance between the data memory unit and the antenna should be kept as low as possible to guarantee a reliable transmission of both energy and data.

SUMMARY OF THE INVENTION

An object of the invention is to provide a filter element and a filter device with a filter element having an operational reliability higher than that of the filter element known from the prior art. At the same time the effort to produce and assemble the filter element is designed to be kept as low as possible.

This object is basically achieved with a filter element for filtering fluids, such as hydraulic liquids or gases. The filter element can be accommodated in a filter housing with an inlet point for the fluid to be filtered and an outlet point for the filtered fluid. Furthermore, the filter element has a data memory unit. Data stored in the data memory can be read electronically out of the data memory by a read and/or write device disposed outside the filter element and referred to as the reader. An antenna extends outside the data memory unit and is provided for the signal coupling between the data memory unit and the reader. Furthermore, the antenna extends at least in sections about a longitudinal axis of the filter element to guarantee a signal coupling between the data memory unit and the read and/or write device, independently of the angular position of the filter element and the data memory unit connected to the filter element.

The filter element is configured at least in sections to be essentially cylindrical. Correspondingly, the filter housing can be configured to exhibit the shape of a pot, with the longitudinal axis of the filter element and the longitudinal axis of the filter housing coinciding in the assembled state. The data memory unit is mounted on the filter element in an eccentric manner in relation to the longitudinal axis. The distance between the data memory unit and the read and/or write device is a function of the angular position of the filter element, specifically, the angular position of the data memory unit in relation to the longitudinal axis of the filter element. If this distance is relatively large, and special interference factors exist, for example, the site of the filter device exhibits locally high electromagnetic radiation, as the case may be in production systems, or the fluid to be filtered generates interference fields, perhaps because the fluid has ions or metallic particles, the signal transmission between the data memory unit and the read and/or write device can then be adversely affected.

In principle, this problem can be compensated by a higher transmission power of the read and/or write device. However, associated with this approach is also a higher consumption of energy that not only incurs higher operating costs, but also requires more installation and assembly effort.

This problem could also be solved in that the filter element and the filter housing have corresponding abutment or locking allowing the filter element to be inserted into the filter housing in only one specific angular position. However, in practice it cannot always be guaranteed under the given, to some extent rugged operating conditions, such as in mobile filter devices in hydraulic systems at construction sites and the like, that the filter elements will be inserted into the filter housing in the correct angular position. Inversely, this correct positioning will mean at a minimum greater assembly effort.

The invention solves this problem in that the antenna for the signal coupling between the data memory unit and the read and/or write device extends at least in sections about the longitudinal axis of the filter element. Consequently, a reliable transmission of data is guaranteed in any angular position of the filter element in relation to the filter housing.

In one embodiment, the antenna extends over an angular range of at least 90°, preferably at least 180°, and in particular at least 270° about the longitudinal axis. Even in the case of an extension of only about 90°, the maximum resulting distance between the antenna and the data memory unit can be reduced to an extent that a reliable signal transmission is guaranteed. In one embodiment the antenna extends essentially over 360° and in the manner of a ring around the longitudinal axis.

In one embodiment the antenna is mounted on or close to an axial end of the filter element. The data memory unit can also be mounted on or close to an axial end of the filter element, preferably detachably connected to the filter element by an encapsulating compound that anchors the filter material. In this respect, the data memory unit can be built in an integral manner into the filter element, for example cast or injection molded into a support tube, an end cap, or an outer jacket of the filter element, or securely attached, for example, by adhesive cementing, welding, or the like, to the filter element. Preferably, it cannot be detachable from the outside. In one embodiment, the data memory unit cannot be detected from the outside. For some applications, it may be advantageous if the position of the data memory unit on the filter element is visible from the outside, for example, in that the data memory unit itself is visible or in that a mark is affixed to the corresponding location. Preferably, the data memory unit does not project beyond the contour of the filter element. In this way, the filter elements according to the invention can also be used in pre-assembled filter housings of existing filter devices.

In one embodiment the antenna is mounted on or in the filter housing, for example on or in a bearing element, with which the filter element can make contact. The antenna disposed inside the filter housing, or a read and/or write head of the read and/or write device can be electrically connected via a fluid-tight connection to the part of the read and/or write device disposed outside the filter housing. The bearing element can exhibit, in particular, an annular abutment surface for the end cap of the filter element. The antenna can be mounted on the side of the bearing element facing away from or towards the filter element.

In particular, the data, specifying the filter element, can be stored in the data memory unit. In this respect these data items may be, for example, data that allow the type of filter element to be identified, for example, with respect to its filter material, the media to be filtered, the dimensions, the production date, and the like. In addition, stored data can allow the individual filter element to be identified, for example, by a serial number issued only once and preferably consecutive. To the extent that the stored data involves data items that are already specified during the production of the filter element, these data items can be stored in a non-rewritable and read-only memory area of the data memory. The data items cannot then be modified and, in particular, cannot be manipulated.

As an alternative or in addition, stored data items can be generated only after the filter element has been manufactured, in particular, operating data of the filter element, such as the date on which the filter element was put into service, the type and duration of use, the filtered medium, and the like. These data items can be stored in a memory area of the data memory that can be written to at least once, preferably in a memory area that can be written to only once, and in which a continuous record taking of the filter element can be filed. The data to be written can be provided with an unalterable date stamp. The writing of these data items is carried out preferably with the read and/or write device. If this memory area is writable only once, it must be guaranteed that the operating data cannot be manipulated afterwards. This approach is advantageous with respect to warranty claims that could be filed in the event that the filter element ceases to function as required. The feature that the data items can be written only once into the data memory can be implemented by software designs, for example, in that each memory address can be used only once for writing and then is no longer available, or by hardware designs, for example, in that during the write-in process the memory operations are irreversible, for example, by fusing the connecting leads.

Preferably, the data memory unit operates on the transponder principle and is ready to transmit data only after a corresponding activation, which may or may not be secured by code words, by the read and/or write device. For example, it is possible for the data items to be read out of the data memory in that the data memory unit or an assigned receiving unit modifies, for example, attenuates, a signal sent by the read and/or write device, as a function of the stored data, or modulates in a specifiable way this signal, for example, by changing the amplitude, phase, or frequency of the electromagnetic field. The read and/or write device has a receiving unit, receiving the modified signal and optionally demodulates it, thus extracting the data from the data memory.

In one particular embodiment of the invention, the energy required to operate the data memory unit can be transmitted from the read and/or write device to the data memory unit or to a receiving unit assigned to the data memory unit and connected to the data memory unit. Preferably, the energy is transmitted in a contactless manner, for example, by providing an adequately strong electromagnetic field or the like.

In one particular embodiment, a control unit, in which at least one part of the read and/or write device can be integrated, can write continuously in predetermined time intervals and/or as a function of events the parameters relating to the operation of the filter element in the filter device into the data memory. These parameters may be data items determined locally at the site of the filter element, for example, the differential pressure occurring via the filter element, or they may be data items specified by a higher level control unit controlling a plurality of read and/write devices, for example, data for characterizing the medium to be filtered.

With the use of the data read out of the data memory, such as the operating period, filtered medium, operating pressure, operating temperature, and the like, a control unit can compute the remaining operating period or the service life of the filter element. This computation can take place in the read and/or write device itself, or the read and/write device can transmit these data items to a higher level control unit. This higher level control unit can monitor and control, especially in a commensurate manner, a plurality of filter elements equipped in accordance with the invention, and can control the filter device, for example, on reaching a critical operating state, so that other filter elements are connected into the system.

The data read out of the data memory and/or the data computed or derived from the data memory can be signalizable at the site of the filter housing by a display unit. For example, an upcoming changing of the filter element can be signaled by illuminants, by an acoustic signal transmitter, or the like.

The antenna can be mounted on the filter housing and can be electrically connected to the read and/or write device by a connecting lead. In this case, the contactless signal transmission to the data memory is carried out by the antenna forming a read and/or write head.

As an alternative, the antenna can also be electrically connected to the data memory unit by an electrical connecting lead. Preferably, the antenna is then mounted on or in an end cap of the filter element, in particular undetachably connected to the filter element by an encapsulating compound anchoring the filter material. In this case, the contactless signal transmission runs from a read and/or write head, which is a component of the read and/or write device and is disposed preferably inside the filter housing, to the antenna electrically connected to the data memory unit.

In an additional embodiment, the antenna is electrically separated from both the read and/or write device and from the data memory unit, and acts only as a coupling coil between a transmitting and receiving coil of the read and/or write device and an antenna of the data memory unit. A suitable configuration of the antenna, especially in the area between the data memory unit of the filter element and a read and/or write head of the read and/or write device of the filter housing, preferably on or close to an axial end of the filter element, can result in an improvement in the contactless transmission of data.

The invention also relates to a filter device comprising the above-described filter element.

In one embodiment, a shut-off valve is connected to the inlet point for the fluid to be filtered and/or to the outlet point for the filtered fluid. Prior to each opening of the shut-off valve, a control unit connected to the read and/or write device and controlling the shut-off valve reads the data from the data memory of the filter element by the read and/or write device. The control unit opens the shut-off valve only if specifiable data items were read previously out of the data memory of the filter element by the read and/or write device. For example, after the filter element has been changed, the control unit can check whether a filter element specified for the current application was installed before the shut-off valves are opened, thereby connecting the filter element into the fluid flow. As a result, damage to both the filter element or the filter device and also predominantly the connected system components can be prevented.

In one embodiment, the data from the data memory can be scanned on a regular basis, for example, in specifiable time intervals, or irregularly, for example, in an event-driven manner, for instance when a special system performance is demanded. The control unit can then close the valves, if the specifiable data were not read out, for example, to reduce a necessary filter performance, or a required remaining operating period, or the pumping capacity of the system.

In one embodiment, the filter housing can be closed with a cover. Prior to each opening of the shut-off valve, the control unit checks by a sensor, for example, an inductive proximity switch, whether the cover is actually closed. The shut-off valve is opened only if the sensor signals that the cover is closed. This sensor can also be queried on a regular basis, and the valves can be closed when the cover is not closed.

In one embodiment, at least one read and/or write head of the read and/or write device is disposed inside the filter housing. The electrical connections of the read and/or write head extend through a fluid-tight passage out of the interior of the filter housing to the outside. The passage is arranged preferably on or close to an axial end of the filter element and/or the filter housing. The passage can extend radially outwards, especially in an area in which a continuing lead or the read and/or write device is mounted on the shell of the filter housing.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are not to scale:

FIG. 2 is an enlarged, partial perspective view of the filter device of FIG. 1; and FIG. 3 is an enlarged, perspective view in section of the filter device from FIG. 1.

DETAILED DESCRIPTION OF THE INVENTION

Figure 1:
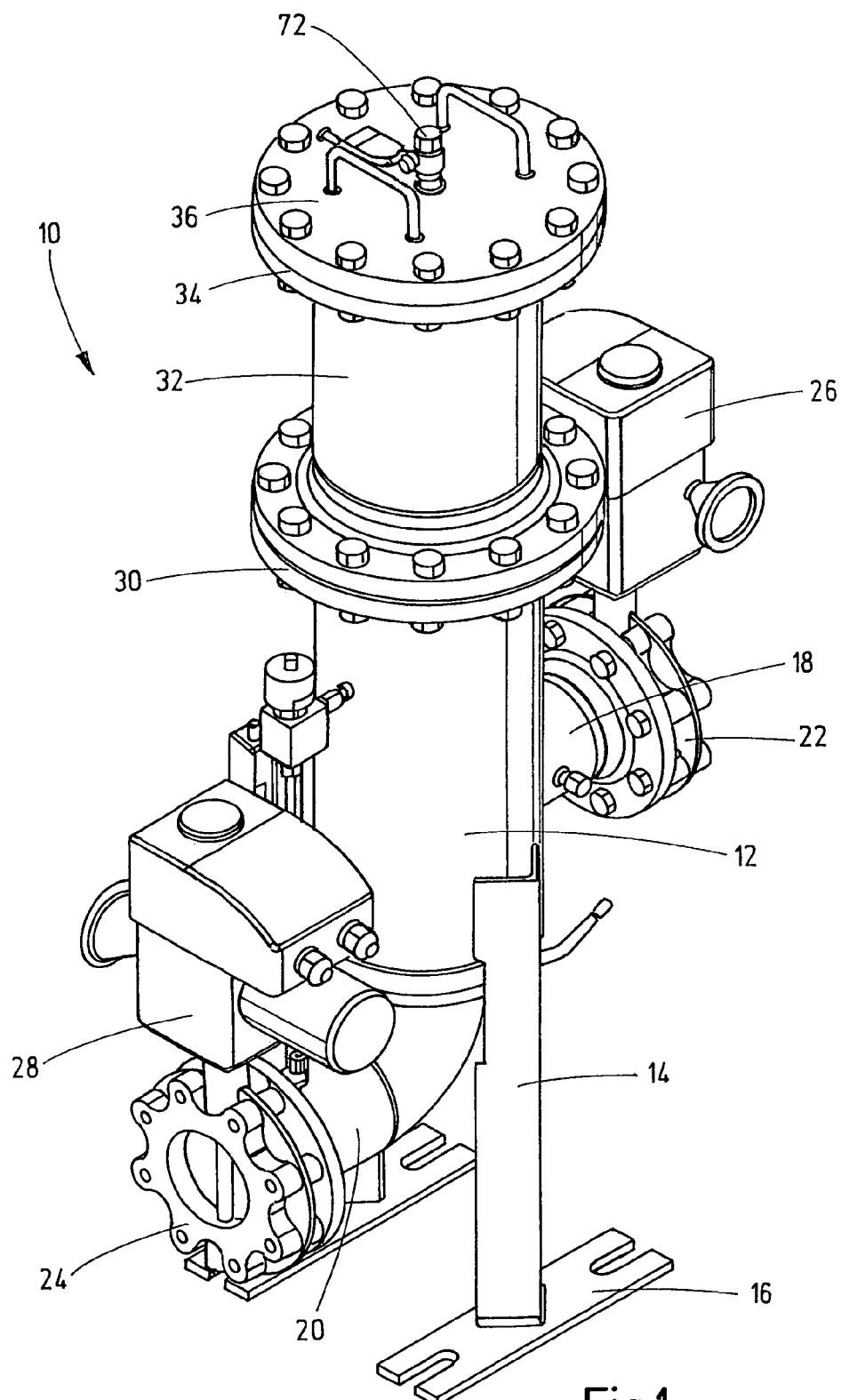
FIG. 1 is a perspective view of a filter device according to the invention.

FIG. 1 is a perspective view of a filter device 10 formed according to the invention and comprises a filter housing 12. Filter Housing 12 is hollow-cylindrical at least in sections and holds a filter element 1 (FIG. 2) in the cavity enveloped by the filter housing. Attached to the filter housing 12 are rails 14, especially L-shaped rails 14 in cross section. These rails are securely connected to mounting plates 16 extending at right angles on ends at a distance from the filter housing 12. The filter device 10 can be stood up by these mounting plates and/or fastened to a carrying device.

The filter housing 12 has an inlet point 18 for the fluid to be filtered and an outlet point 20 for the filtered fluid. On their ends at a distance from the filter housing 12, the inlet point 18 and the outlet point 20 expand in the manner of flanges. A first shut-off valve 22 is mounted on the flange of the inlet point 18. A second shut-off valve 24 is mounted on the outlet point 20. The first and the second shut-off valve 22, 24 can be motor-driven in a controllable manner by a control unit. To this end, the first shut-off valve 22 has a first drive unit 26. The second shut-off valve 24 has a second drive unit 28.

The filter housing 12 is open towards one side to insert the filter element 1. The open side has a closure flange 30 on which can be mounted a closure element 32 configured to be essentially tubular and circularly cylindrical and defining a cavity in which a pollution monitoring device can be installed. The end of the closure element 32 at a distance or remote from the filter housing 12 has a flange 34, on which a closure plate 36 can be securely mounted. The filter device 10 has ventilating means or ventilator 72, preferably a ball cock and preferably eccentrically on the closure plate 36. In addition, the filter device 10 has a sensor or switch connected to the control unit. The sensor can detect whether the filter housing 12 is closed by the closure element 32 and/or the closure plate 36.

FIG. 2 is a perspective view of an enlarged detail of the filter device 10 from FIG. 1 in the area of the outlet point 20 with the filter housing 12 shown partially cut open. FIG. 3 is a cross-sectional view of an additional enlarged detail of the filter device 10 in the area of the outlet point 20. The pipeline forming the outlet point 20 projects as a connector into the floor area of the filter housing 12 and forms, in the area of a mounting connector 38, an annular shoulder 40 on which is set an annular bearing element 42. The bearing element 42 has an offset with two sections extending parallel to each other, being offset axially in the direction of the longitudinal axis 44 and extending at right angles to the longitudinal axis 44. The bearing element 42 makes contact via one of these sections on the shoulder 40 and forms with the other of these sections a set-down surface for the filter element 1.

The filter element 1 is configured so as to be essentially cylindrical and in particular circularly cylindrical with the longitudinal axis 44 and envelops radially inwardly a support tube 46 on which the filter material 48 is affixed. An end cap 50 is mounted axially on the end of the filter element 1. This end cap seals axially the filter element 1 and is placed on the bearing element 42. At least at one point in the circumferential direction about the longitudinal axis 44, the filter element 1 has a data memory unit 52 preferably mounted on the area of the end cap 50 facing the filter material 48. In particular, data memory unit 52 is integrated into the end cap 50 to be undetachable from the filter element 1. Preferably, the data memory unit 52 is embedded into an encapsulating compound that connects securely and undetachably the filter material 48 to the end cap 50.

On or close to the end of the filter housing 12 adjacent to the outlet point 20, a passage 54 is cut into the wall of the filter housing. This passage 54 allows an electrical connection to extend medium-tight or fluid-tight through the wall of the filter housing 12 either to an antenna 60 or to a read and/or write or read/write head 56 projecting radially in relation to the longitudinal axis 44 into the cavity. The cavity is enveloped by the filter housing 12 and accommodates the filter element 1. The passage 54 extends at right angles to the longitudinal axis 44 to the proximity of the mounting connector 49 and is arranged axially in the area of the bearing element 42. In this area, the bearing element 42, has a cylindrical section 62 extending parallel to the longitudinal axis 44 on the radially external peripheral edge of the bearing element 42 and has an opening for the passage 54 for the read and/or write head to pass through.

On the side opposite the filter element 1, in particular opposite the end cap 50, the section of the bearing element 42 extend at right angles to the longitudinal axis 44 and forming the bearing surface for the end cap 50 has an antenna 60. Antenna 60 extends as a circular ring about the longitudinal axis 44 and, in the simplest case, can be formed by a conductor loop. The annular configuration of the antenna 60 guarantees a reliable signal coupling between the data memory unit 52 and the read and/or write head 56, independently of the angular position of the filter element 1, in particular independently of the position of the data memory unit 52. The electrical connection to the antenna 60 or to a read and/or write head 56 is extended via a connecting tube 64 downstream of the passage 54 and outside the filter housing 12 to the control unit. A part of the read and/or write device or read/write device 70 can also be integrated in the control unit or can be configured at least to some extent as one structural unit with the read and/or write device 70.

The floor area of the filter housing 12 extending as a ring around the mounting connector 38 has a drain 66 connected to a shut-off valve 68 in a fluid-tight manner. This shut-off valve can be manually operated. Even in the event that a second shut-off valve 24 is closed, the filter housing 12 can be drained by the first shut-off valve.

In the event that the filter is replaced, the control unit closes the first and the second shut-off valves 22, 24. As a result, the filter device 10 is removed from the fluid circuit. After a potentially necessary draining of the filter housing 12 via the drain 66, the used filter element 1 can be removed. After a new filter element 1 has been inserted, the control unit queries the data memory 52 by the read and/or write device. The resulting data read out are checked according to specifiable criteria, for example, whether the newly installed filter element 1 is specified for the filter device 10 or the like. As an alternative or in addition, the control unit can also query whether the sensor or the switch signals a proper closure of the filter housing 12 by closure element 32 and/or closure plate 36. Should one of the specified criteria not be satisfied or not completely satisfied, the control unit locks the first and second shut-off valve 22, 24 in the closed state, optionally also against manual actuation to prevent the filter device 10 from being connected again into the fluid circuit.

While one embodiment has been chosen to illustrate the invention, it will be understood by those skilled in the art that various changes and modifications can be made therein without departing from the scope of the invention as defined in the appended claims.

What is claimed is:

1. A filter device for filtering fluid, comprising:
a filter housing having an internal cavity, an inlet for fluid to be filtered, an outlet for filtered fluid and bearing element in said filter housing adjacent said outlet;
a filter element received in said internal cavity of said filter housing, contacting said bearing element and having a data memory unit, said memory unit having data stored therein readable electronically by a read/write device, said filter element having a longitudinal axis;
a passage extending through a wall of said filter housing and into said internal cavity adjacent said outlet and receiving an electrical connection; and
an antenna extending outside of said data memory unit and extending at least in sections about said longitudinal axis to guarantee a signal coupling between said data memory unit and the read/write device independently of an angular position of said filter element and said data memory unit connected to said filter element in said filter housing, said antenna being one of in and on said bearing element, said electrical connection extending to the read/write device and extending radially to at least one of said longitudinal axis and said antenna, said passage extending radially relative to said longitudinal axis and located axially adjacent said bearing element.

2. A filter device according to claim 1 wherein said passage extends radially to a point adjacent a mounting connector in said filter housing.

3. A filter device according to claim 1 wherein
said antenna extends over an angular range of at least 90° about said longitudinal axis.

4. A filter device according to claim 3 wherein
said angular range is at least 180°.

5. A filter device according to claim 4 wherein
said angular range is at least 270°.

6. A filter element according to claim 1 wherein
said antenna is adjacent an axial end of said filter element.

7. A filter device according to claim 1 wherein
said filter element includes an end cap directly engaging said bearing element.

8. A filter device according to claim 1 wherein
a shut-off valve is attached to at least one of said inlet and said outlet; and
a control is connected to the read/write device and to said shut-off valve to regulate operation thereof responsive to said data stored in said memory unit to open said shut-off valve and to connect said filter element into a fluid flow only if specifiable data items are read from said data memory unit by the read/write device.

9. A filter device according to claim 8 wherein
a closure element closes said filter housing; and
a sensor connected to said control regulates operation of said shut-off valve to open said shut-off valve only if said sensor senses said closure element is a proper closed position on said filter housing.

10. A filter device according to claim 8 wherein
a read/write head of the read/write device is disposed inside said filter housing; and
said electrical connection is coupled to said read/write head and extends through said passage fluid and pressure tight from said internal cavity to an outside of said filter housing.

11. A filter device according to claim 8 wherein
the read/write device is mounted on said filter housing.

* * * * *